US00RE40047E

(19) United States
(12) Reissued Patent
Carroll

(10) Patent Number: US RE40,047 E
(45) Date of Reissued Patent: Feb. 12, 2008

(54) SPORTS SHOE CLEATS

(75) Inventor: Francis C. Carroll, Philadelphia, PA (US)

(73) Assignee: GreenKeepers of Delaware, Wilmington, DE (US)

(21) Appl. No.: 10/797,934

(22) Filed: Mar. 11, 2004

Related U.S. Patent Documents

Reissue of:
(64) Patent No.: 6,530,162
Issued: Mar. 11, 2003
Appl. No.: 09/027,867
Filed: Feb. 23, 1998

U.S. Applications:

(63) Continuation-in-part of application No. 08/802,908, filed on Feb. 20, 1997, now Pat. No. 5,794,367.

(51) Int. Cl.
*A43B 5/00* (2006.01)

(52) U.S. Cl. ..... 36/134; 36/67 R; 36/67 D
(58) Field of Classification Search ..... 36/127, 36/134, 67 R, 67 D, 67 A, 59 A, 59 C
See application file for complete search history.

(56) References Cited

U.S. PATENT DOCUMENTS

| | | | | | |
|---|---|---|---|---|---|
| 39,575 | A | * | 8/1863 | Hyatt et al. | 36/59 A |
| 180,578 | A | * | 8/1876 | Gunsalus | 36/59 R |
| 416,861 | A | * | 12/1889 | Scafe | 36/59 A |
| 485,459 | A | * | 11/1892 | Crocker | 36/59 R |
| 962,719 | A | * | 6/1910 | Pratt | 36/59 B |
| 1,093,358 | A | * | 4/1914 | Schroeder | 36/59 R |
| 1,243,209 | A | * | 10/1917 | Park | 36/59 R |
| 1,304,616 | A | * | 5/1919 | Smith | 36/59 R |
| 1,355,827 | A | * | 10/1920 | Finneran | 36/59 R |
| 1,422,716 | A | * | 7/1922 | Jones | 36/59 R |
| 1,749,351 | A | * | 3/1930 | McQueen | 36/59 R |
| 1,876,195 | A | * | 9/1932 | Youmans | 36/73 |
| 2,095,095 | A | * | 10/1937 | Howard | 36/59 R |
| 2,336,632 | A | * | 12/1943 | Park | 36/59 R |
| 2,491,596 | A | * | 12/1949 | Zaleski et al. | 36/59 R |
| 2,803,070 | A | * | 8/1957 | Passidomo et al. | 36/59 R |
| 2,844,833 | A | * | 7/1958 | Odermatt | 12/146 B |
| 2,895,235 | A | * | 7/1959 | Melchiona | 36/59 R |
| 3,487,563 | A | * | 1/1970 | Austin | 36/67 D |
| 3,512,275 | A | * | 5/1970 | Leavitt | 36/59 R |
| 3,559,310 | A | * | 2/1971 | Kiela | 36/7.3 |
| 3,583,082 | A | * | 6/1971 | Jordan | 36/59 R |
| 3,583,083 | A | * | 6/1971 | Drew | 36/62 |

(Continued)

FOREIGN PATENT DOCUMENTS

| | | | |
|---|---|---|---|
| CA | 2074286 | * | 1/1994 |

(Continued)

OTHER PUBLICATIONS

"A Unique Holiday Offer", Softspikes, Golf Digest Dec. 1996, p. 149.*

*Primary Examiner*—M. D. Patterson
(74) *Attorney, Agent, or Firm*—Blank Rome LLP

(57) ABSTRACT

A golf shoe cleat has a main body member having a dome-shaped outer face and a planar inner face, a threaded stud molded integrally with the main body member and projecting outwardly from the inner face. A plurality of pseudo pyramid-shaped teeth projecting around the perimeter of the main body member, each of the pseudo pyramid-shaped teeth having an outward angle to provide lateral stability and traction through the plane of a sports swing. The traction teeth have a low profile to reduce damage to putting green surfaces for example. An anti-debris ring is formed on the peripheral edge of the planar inner face. In this position, the anti-debris ring tends to prevent the edge of the cleat from separating from the sole of the golf shoe thereby foreclosing the entry of debris underneath the cleat. At the same time, when the cleat is snugged down by the application tool, the pressure causes the ring to more closely hug the sole and precludes the entry of debris.

24 Claims, 4 Drawing Sheets

U.S. PATENT DOCUMENTS

| | | | | | |
|---|---|---|---|---|---|
| 3,656,245 | A | * | 4/1972 | Wilson | 36/67 D |
| 3,672,077 | A | * | 6/1972 | Coles | 36/134 |
| 3,818,617 | A | * | 6/1974 | Dassler et al. | 36/32 R |
| 3,856,065 | A | * | 12/1974 | Gehring | 411/302 |
| 3,859,739 | A | * | 1/1975 | Dassler | 36/67 D |
| 4,014,114 | A | * | 3/1977 | Jordan et al. | 36/67 D |
| 4,141,158 | A | * | 2/1979 | Benseler et al. | 36/32 R |
| 4,180,923 | A | * | 1/1980 | Dassler | 36/32 R |
| 4,309,376 | A | * | 1/1982 | Ueno et al. | 264/241 |
| 4,327,503 | A | * | 5/1982 | Johnson | 36/32 R |
| 4,330,950 | A | * | 5/1982 | Reddien | 36/127 |
| 4,366,632 | A | * | 1/1983 | Bente | 36/67 D |
| 4,375,728 | A | * | 3/1983 | Dassler | 36/32 R |
| 4,392,312 | A | * | 7/1983 | Crowley et al. | 36/67 R |
| 4,521,979 | A | * | 6/1985 | Blaser | 36/29 |
| 4,527,345 | A | * | 7/1985 | Lopez Lopez | 36/127 |
| 4,571,852 | A | * | 2/1986 | Lamarche et al. | 36/32 R |
| 4,587,748 | A | * | 5/1986 | Collins | 36/127 |
| 4,734,002 | A | * | 3/1988 | Holmes | 411/311 |
| 4,777,738 | A | * | 10/1988 | Giese et al. | 36/32 R |
| 4,782,604 | A | * | 11/1988 | Wen-Shown | 36/127 |
| 4,837,949 | A | * | 6/1989 | Dufour | 36/127 |
| 4,885,851 | A | * | 12/1989 | Peterson | 36/127 |
| 5,029,405 | A | | 7/1991 | DeHaitre | |
| D327,975 | S | | 7/1992 | Saito et al. | |
| 5,259,129 | A | * | 11/1993 | Deacon et al. | 36/127 |
| D342,373 | S | | 12/1993 | Saito et al. | |
| 5,321,901 | A | * | 6/1994 | Kelly | 36/134 |
| 5,367,793 | A | * | 11/1994 | Deacon et al. | 36/127 |
| 5,505,012 | A | | 4/1996 | Walker et al. | |
| D371,453 | S | | 7/1996 | Deacon et al. | |
| D371,895 | S | | 7/1996 | McMullin | |
| 5,533,282 | A | * | 7/1996 | Kataoka et al. | 36/129 |
| D373,675 | S | | 9/1996 | McMullin | |
| 5,581,913 | A | * | 12/1996 | Kataoka et al. | 36/134 |
| D387,548 | S | | 12/1997 | McMullin | |
| D390,693 | S | | 2/1998 | Curley, Jr. | |
| 5,761,833 | A | | 6/1998 | McMullin | |
| 5,794,367 | A | * | 8/1998 | Carroll | 36/134 |

FOREIGN PATENT DOCUMENTS

| | | | | |
|---|---|---|---|---|
| DE | 185659 | | * | 9/1905 |
| DE | 1 962 430 | U | | 6/1967 |
| DE | 2529027 | | * | 1/1977 |
| DE | 2540426 | | * | 3/1977 |
| DE | 34380060 | | * | 6/1985 |
| DE | 3811513 | | * | 10/1989 |
| DE | 38 11 813 | A1 | | 10/1989 |
| EP | 342232 | | * | 11/1989 |
| EP | 0 524 861 | A1 | | 1/1993 |
| EP | 9109475 | | * | 1/1993 |
| FR | 493748 | | * | 12/1918 |
| FR | 807754 | | * | 1/1937 |
| FR | 9109475 | | * | 1/1993 |
| GB | 5399 | | | 3/1884 |
| GB | 6877 | | * | 4/1895 |
| GB | 2814 | | * | 2/1914 |
| GB | 1378461 | | * | 12/1974 |
| GB | 1434282 | | * | 5/1976 |
| GB | 2 053 658 | A | | 2/1981 |
| GB | 2223394 | | * | 4/1990 |
| GB | 2248762 | | * | 4/1992 |
| IT | 467815 | | * | 12/1951 |
| JP | 688851 | S | | 6/1986 |
| JP | 688851-001 | S | | 2/1989 |
| JP | B5-914 | A | * | 5/1989 |
| JP | 762928 | | * | 5/1989 |
| JP | 688851-002 | S | | 6/1989 |
| JP | 821778 | S | | 8/1991 |
| JP | 832081 | S | | 12/1991 |
| JP | 832081-001 | S | | 3/1992 |
| JP | 832081-002 | S | | 4/1992 |
| JP | 9-37804 | A | | 2/1997 |
| WO | WO 89/01302 | | * | 2/1989 |
| WO | WO 91/03960 | | * | 4/1991 |
| WO | WO 91/15131 | A1 | | 10/1991 |
| WO | WO 98/35575 | A1 | | 8/1998 |

* cited by examiner

SPORTS SHOE CLEATS

Matter enclosed in heavy brackets [ ] appears in the original patent but forms no part of this reissue specification; matter printed in italics indicates the additions made by reissue.

REFERENCE TO RELATED APPLICATION

This application is a continuation-in-part application of my application Ser. No. 08/802,908 for SPORTS SHOE CLEATS filed Feb. 20, 1997 now U.S. Pat. No. 5,794,367.

The present invention is directed to golf shoe cleats, and more particularly to golf shoe cleats or spikes in which the cleat is molded from a durable plastic material and includes outwardly angled traction teeth and in a preferred embodiment has an anti-debris ring.

BACKGROUND AND BRIEF DESCRIPTION OF THE INVENTION

The three biggest complaints made about existing golf shoe spikes or cleats are lack of traction, and durability and that they need to be cleaned off during the course of a game. There have been attempts to solve these problems in the past. In Deacon et al U.S. Pat. Nos. 5,536,793 and 5,259,129, the golf cleat or spike is comprised of a plastic molding in which the traction action is provided by ridges curved in planes parallel to the shoe sole emanating out in radial fashion from the center of the disk-like flange and being integrally formed with and extending down from the bottom of the surface. In U.S. Pat. No. 4,723,366, a traction cleat is provided which has a metal stud infrastructure at the core of the cleat and a plastic skirt molded directly on the flange of the metal infrastructure. The curved rib structure of the above Deacon et al patents is also disclosed in Design U.S. Pat. Nos. Des. 375,192; U.S. Pat. No. Des. 372,355; U.S. Pat. No. Des. 371,453 and U.S. Pat. No. Des. 366,755.

The object of the present invention is to provide an improved golf shoe cleat which has better traction and lateral stability. A further object of the invention is to provide a golf shoe cleat with improved anti-debris properties.

THE PRESENT INVENTION

The present invention provides a golf shoe cleat which utilizes low profile pseudo pyramid-like shaped "traction teeth". Although the pseudo-pyramid shape is preferred, other geometric shapes can be used. For example, the traction teeth can be conically shaped. In a preferred embodiment, a center tooth or wear pad protrudes straight down to provide traction, and a plurality of angled traction teeth are in a generally circular perimetrical pattern and protrude at an outward angle to provide traction and lateral stability during a golf swing. Due to the orientation of the teeth, the cleat is more durable. Moreover, a material is utilized which not only provides resilience and flexibility for traction but also possesses a durability characteristic needed to achieve an acceptable product life. In addition, the cleat of the present invention helps keep the build-up of debris to a minimum. An anti-debris ring is molded on the rim or edge of the underside of the cleat. The traction teeth and dome-shaped outer face are designed to move debris outwardly away from the traction teeth. According to the cleat of the present invention, the outward angled traction teeth around the perimeter, unlike any other cleat, provides lateral stability and traction through the plane of a golf swing. These teeth are low in profile (e.g. are shorter than conventional spikes) to reduce damage to putting green surfaces. In addition, in the preferred embodiment, the cleat has a wear pad in the center. This wear pad is a weight-bearing surface. Although it may offer some traction, it is there to support the majority of the body weight placed on the cleat, tending to keep weight off the traction teeth to prolong the life of the teeth and the cleat.

Because most of its body weight is directed toward the center of the cleat, the cleat wears from the inside out. As the cleat wears from the inside out, the traction teeth also wear in an outward manner. This allows the teeth to maintain the desired outward angle needed to provide lateral traction throughout the life of the cleat.

The anti-debris ring is a rib which is on the peripheral edge of the underside of the cleat. In this position the anti-debris ring tends to prevent the edge of the cleat from separating from the sole of the golf shoe, thereby precluding the entry of debris. At the same time, when the cleat is snugged down, the pressure causes the ring to more closely hug the shoe sole and preclude the entry of debris.

The preferred material for the construction is a polyurethane material with about a 55D durometer hardness. However, it can be manufactured out of any suitable material with a preferred hardness range from 45D to 95D durometer hardness.

Some cleats currently in the market have an annular ring of latching teeth surrounding the threaded stud and a coacting ring of complementary formations in a receptacle in the shoe sole. Other cleats on the market are provided with so-called "quick release" locking or mounting structures. Such features may be incorporated in the golf cleat of this invention.

DESCRIPTION OF THE DRAWINGS

The above and other objects, advantages and features of the invention will become more apparent when considered with the following specification and accompanying drawings wherein.

DETAILED DESCRIPTION OF THE INVENTION

Figure 1:
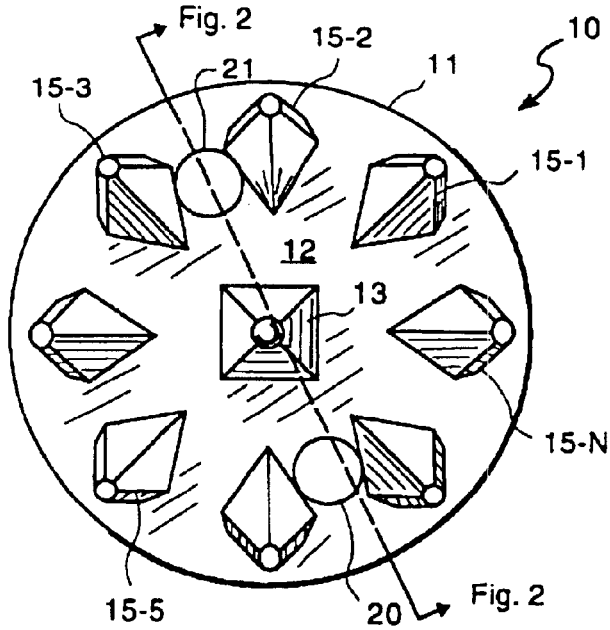
FIG. 1 is a front view of a golf shoe cleat incorporating the invention.
Figure 2:
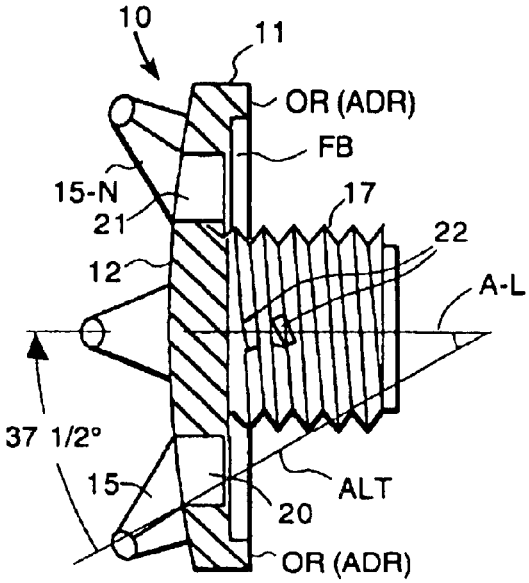
FIG. 2 is a side elevational view of the golf shoe cleat incorporating the invention.
Figure 3:
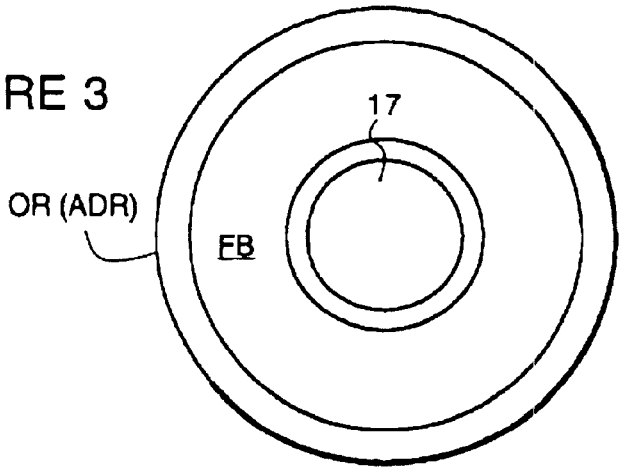
FIG. 3 is a back view of the golf shoe incorporating the invention.
Figure 4:
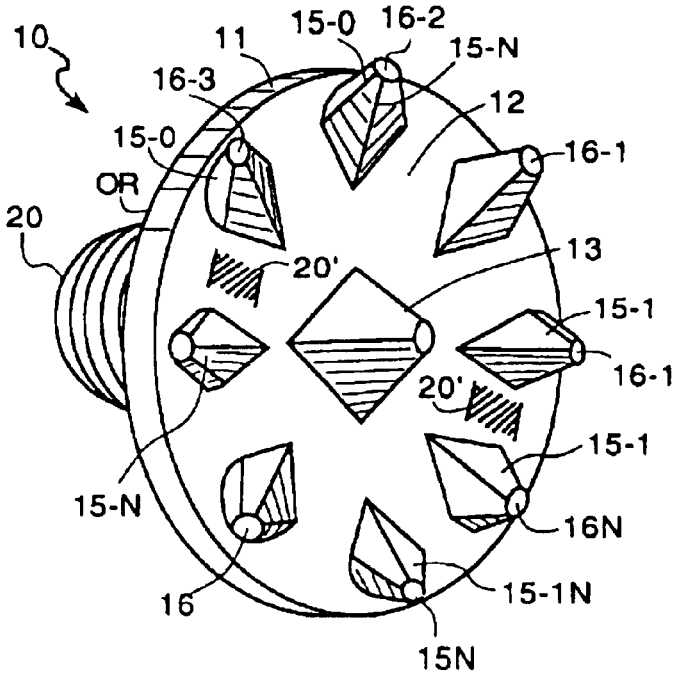
FIG. 4 is a ¾ angle isometric view of the golf shoe spike or cleat incorporating the invention.

Referring now to FIGS. 1–4 of the drawings, a cleat 10 is preferably of molded plastic polyurethane with about a 55D durometer hardness but which can be manufactured out of any suitable material with a preferred hardness range from about 44D to about 95D durometer hardness. The body 11 has a domed outer face 12 with a center-pyramid shaped wear pad 13 surrounded by a circular array of pseudo pyramid-shaped traction teeth 15-1, 15-2 . . . 15-N, and in the present embodiment N is 8, so that in the cleat illustrated, there are nine teeth with the center tooth 13 serving as a wear pad. The pseudo pyramid-shaped teeth have a curved outer face 15-0 and an angulated or faceted face 15-IN. Each of the outward angled traction teeth in the array 15-1, 15-2, 15-3 . . . 15-N are traction teeth and are angled outwardly around the perimeter. This circular array of outwardly angled traction teeth 15-1, 15-2, 15-3 . . . 15-N provides lateral stability and traction through the plane of a golf swing. In one preferred embodiment this outward angulation is at an angle of about 37½°, e.g. measured from axial line AL passing through threaded shoe mounting stud 17 to the axial line ALT of each tooth. In a preferred embodiment each traction tooth has a low profile. Moreover, these angled teeth are low in profile to reduce damage to putting green surfaces, and the peak or tip 16-1, 16-N2 . . . 16-N of each tooth 15-1, 15-2 . . . 15-N is flat or rounded.

An anti-debris ring OR is formed on the peripheral edge of the planar surface face or flat base FB and coaxial with threaded mounting stud 17. This anti-debris ring strengthens the edge of the cleat and prevents it from separating from the sole of the golf shoe and precludes or forecloses the entry of grass or other debris between the cleat and golf shoe sole when the cleat has been snugged down by the application tool (not shown).

This configuration of the teeth of the cleat whereby the pseudo pyramid-shaped traction teeth 15-1, 15-2 . . . 15-N are angled outward around the perimeter of body 11 provides both lateral stability and traction through the plane of a golf swing. These teeth, as noted above, are low in profile to reduce damage to the putting greens and preferably do not have sharp points. In addition, the wear pad 13 in the center of the dome-shaped body member 11 provides a weight-bearing surface. Although this may offer some traction, its main purpose is to support the majority of the body weight placed on the cleat, keeping weight off the traction teeth to prolong the life of the teeth and the cleat. Since most of the body weight is directed toward the center of the cleat, it wears away from the inside out. As the cleats or teeth 15-1, 15-2 . . . 15-N wear from the inside out, the traction teeth also wear in an outward manner. This allows the teeth to maintained the desired outward angle needed to provide lateral traction throughout the life of the cleat.

Figure 5:
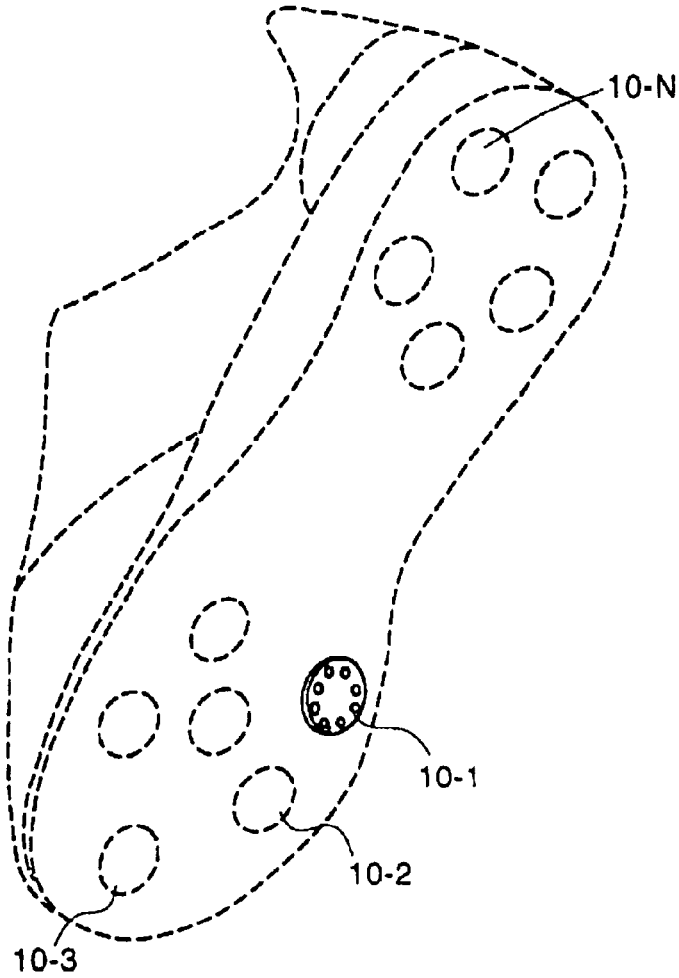
FIG. 5 is an isometric perspective view of a golf or sports shoe with a cleat incorporating the present invention installed.
Figure 6:
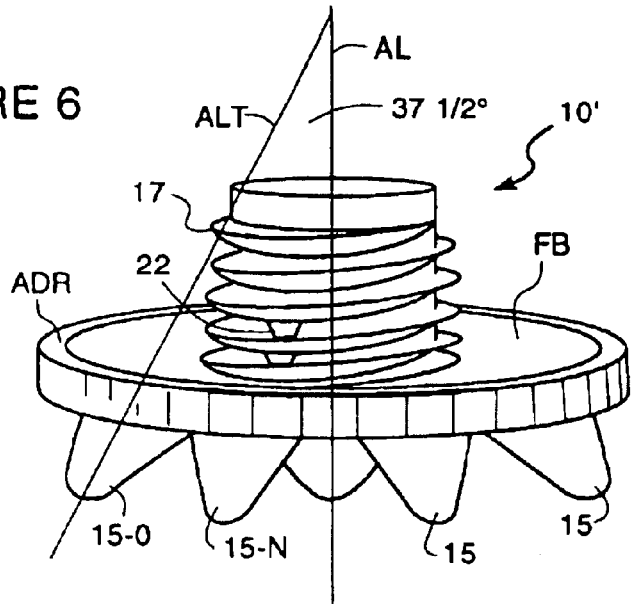
FIG. 6 is an isometric perspective view of a golf cleat incorporating an annular anti-debris rib ring of traction teeth.

A pair of circular (or rectangular) depressions 20, 21 are adapted to accept the conventional two-prong installation tool which fits into engagement in recesses 20, 21 to provide torque and rotation of the golf cleat so as to cause the threads 17 which are engaged with are engaged with the conventional threaded cleat holes or receptacles fixed in the bottom of a conventional golf shoe as shown in FIG. 5 in which a plurality of cleats 10-1, 10-2 . . . 10-N have been installed.

The threads 17 of threaded stud 20 adjacent the flat base FB of the main body member 11 are provided with a plastic fillet 22 which serves the function of locking the cleat in the threaded bore of the cleat receptacle on the shoe.

Figure 7A:
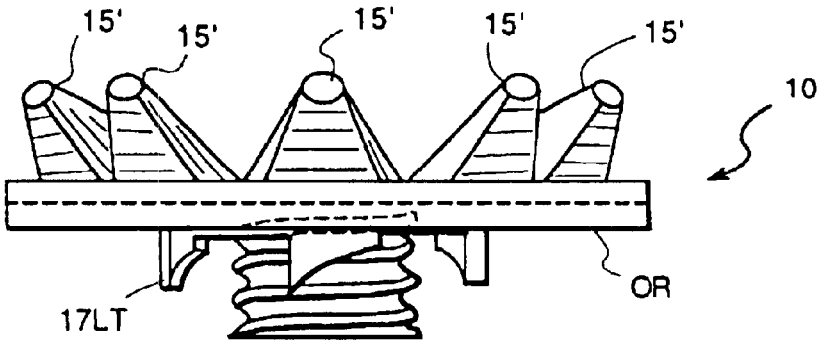
FIGS. 7a and 7b are side elevation and bottom views of an embodiment showing a first alternative known cleat-to-shoe attachment technique.
Figure 7B:
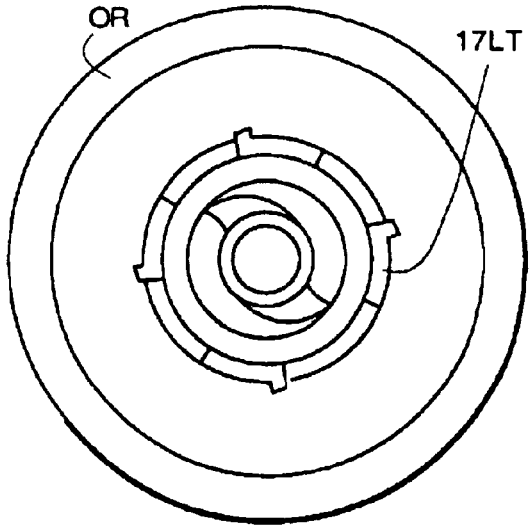
Figure 8A:
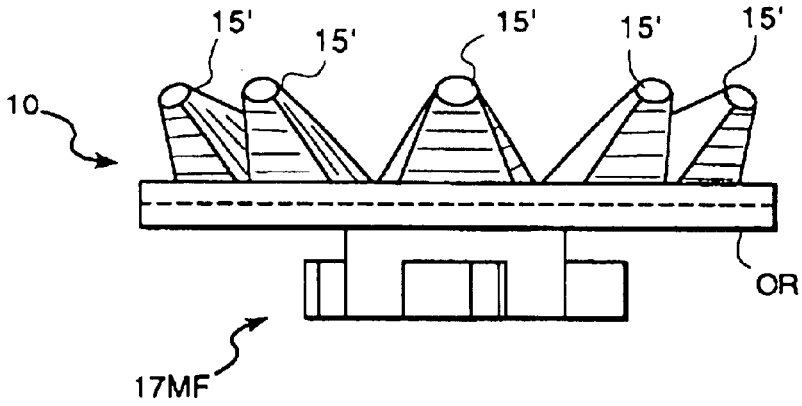
FIGS. 8a and 8b are side elevation and bottom views of a further embodiment incorporating alternative known cleat-to-shoe attachment technique.
Figure 8B:
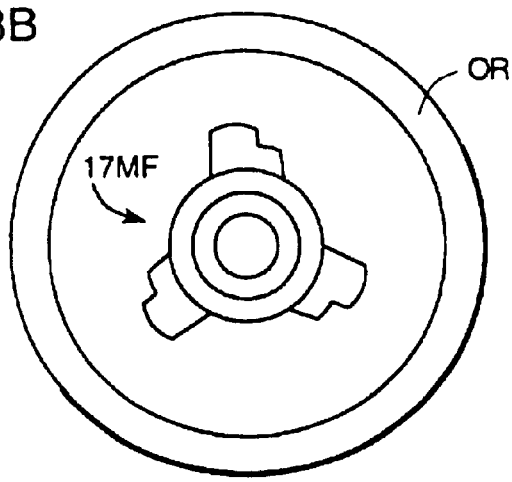
Figure 9:
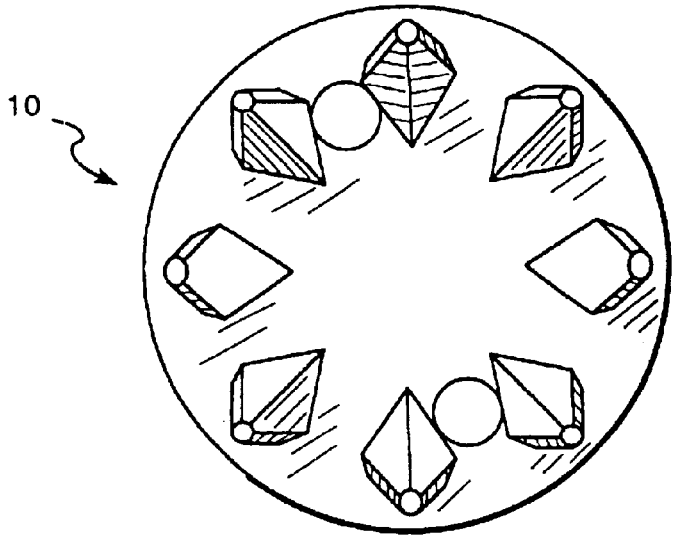
FIG. 9 is a front view of a further embodiment in which the wear pad has been eliminated.

In addition, some current golf cleats are provided with a series of latching teeth 17LT surrounding threaded stud 17' which coact with a complementary locking formation in surrounding the female threaded aperture in the sole of the shoe. See FIGS. 7a and 7b. Another cleat attachment technique shown in FIGS. 8a and 8b uses two interlocking triangles: a female receptacle in the sole of the shoe (not shown) and a male fastener structure 17MF on the cleat. One would not depart from the principles of this invention by incorporating such a mounting or attachment features in the golf shoe cleat disclosed herein. Moreover, while the embodiment incorporating the wear pad is preferred, the angled traction teeth can provide advantageous traction in the absence of the wear pad and such an embodiment is indicated in FIG. 9.

As noted earlier, the preferred material for construction of the shoe is a polyurethane with a 55d durometer hardness but which can be manufactured out of any suitable material with a preferred hardness ranging from about 45d to 95d durometer hardness.

While the invention has been shown and described in the reference to a preferred embodiment of the invention, it will be understood that the invention is not limited thereto but may be modified, adapted and changed by those skilled in the art and still be within the scope of the invention as defined by the following claims:

What is claimed is:

1. A golf shoe cleat comprising a body member having an outer face and an inner face, shoe mounting member having an axis AL which is perpendicular to said inner face and projecting outwardly from said inner face and adapted to secure said, cleat in a receptacle in said golf shoe upon rotation of said shoe mounting member in said receptacle, a circular array of shaped traction teeth projecting outwardly around the perimeter of said outer face, each traction tooth having an axis ALT and an outer traction tooth surface, each outer traction tooth surface and axis ALT having an outward angulation relative to said axis AL to provide lateral stability and enhanced traction through the plane of a golf swing and wherein said inner face has a peripheral edge spaced from said shoe mounting member and an anti-debris ring formed integrally with said body member and projecting from said inner face.

2. A golf shoe cleat comprising a main body member having a dome-shaped outer face and a planar inner face, a shoe attaching member projecting outwardly from said planar inner face having an axis AL perpendicular to said planar inner face, a circular array of shaped traction teeth projecting around the perimeter of said main body member, each traction tooth having an axis ALT, said axis ALT having an outward angulation relative to said axis AL to provide lateral stability and traction through the plane of a golf swing, said outward angulation being about 37½°.

3. A golf shoe cleat comprising a body member having an outer face and an inner face, shoe mounting member having an axis AL which is perpendicular to said inner face and projecting outwardly from said inner face and adapted to secure said cleat in a receptacle in said golf shoe upon rotation of said shoe mounting member about said axis in said receptacle, a circular array of low profile traction teeth projecting outwardly around the perimeter of said outer face, each traction tooth having a traction surface which faces away from said axis AL, each traction tooth having an axis ALT and each axis ALT having an outward angulation relative to said axis AL to provide lateral stability and enhanced traction through the plane of a golf swing.

4. The cleat defined in claim 3 wherein said inner face has a peripheral edge spaced from said shoe mounting member and an anti-debris ring formed integrally with said body member and projecting from said inner face.

5. A golf shoe cleat comprising a main body member having a dome-shaped outer face and a planar inner face, a shoe attaching member projecting outwardly from said inner face having an axis AL perpendicular to said planar inner face and adapted to secure said cleat in a receptacle in said golf shoe upon rotation of said shoe mounting member in said receptacle, an annular anti-debris ring formed on the edge of said planar inner face, a plurality of shaped traction teeth projecting in a circular array around the perimeter of said main body member, each traction tooth being spaced from said axis AL and having an axis ALT and an outer traction surface facing away from said axis AL, each said outer axis ALT and traction surface having an outward angulation relative to said axis AL to provide lateral stability and traction through the plane of a golf swing.

6. A golf shoe cleat comprising a main body member having a dome-shaped outer face and a planar inner face, shoe attachment means having an axis AL, said shoe attachment means projecting outwardly from said inner face and adapted to secure said cleat in a receptacle in said golf shoe upon rotation of said shoe mounting member in said receptacle, a plurality of pseudo pyramid-shaped teeth projecting around the perimeter of said main body member, each pseudo pyramid-shaped tooth having an axis ALT and an outwardly angled traction surface which faces away from said axis AL and provides lateral stability and traction through the plane of a golf swing, said teeth being in a low profile to reduce damage to putting green surfaces, said body member having an anti-debris ring on the peripheral edge of said planar inner face.

7. A golf shoe cleat comprising a molded main body member having a dome-shaped outer face and a planar inner face, a mounting member projecting vertically outwardly from said inner face and having an axis AL and adapted to secure said cleat in a receptacle in said golf shoe upon rotation of said shoe mounting member in said receptacle, said main body member having a circular perimeter, a plurality of traction teeth circumferentially spaced around said circular perimeter of said main body member, each traction tooth having an axis ALT and an outwardly angled outer traction surface which faces away from said axis AL to provide lateral stability and traction through the plane of a golf swing.

8. The golf shoe cleat defined in claim 7 wherein said traction teeth are pseudo pyramid-shaped.

9. A golf shoe cleat comprising a main body member having an inner face and an outer face, a shoe-attaching member projecting perpendicularly outwardly from said inner face and said shoe-attaching member having an axis AL and adapted to secure said cleat in a receptacle in said golf shoe upon rotation of said shoe mounting member in said receptacle, a plurality of low-profile traction teeth projecting around the perimeter of the outer face of said main body member in a circular array, each traction tooth having an axis ALT and outer traction surface which are angled away from said axis AL, said outer traction surface having an outward angulation relative to said axis AL to enhance lateral stability and traction through the plane of a golf swing.

10. A golf shoe cleat comprising a main body member having an inner face and an outer face, a shoe-attaching member projecting perpendicularly outwardly from said inner face and said shoe-attaching member having an axis AL and adapted to secure said cleat in a receptacle in said golf shoe upon rotation of said shoe mounting member in said receptacle, a plurality of low-profile traction teeth projecting around the perimeter of the outer face of said main body member, each traction tooth having an outer traction surface facing away from said axis AL, said outer surface having an outward angulation relative to said axis AL to enhance lateral stability and traction through the plane of a golf swing.

11. The golf shoe cleat defined in claim [10] *9* wherein the angle between each said tooth axis ALT and said axis AL is about 37½ degrees.

*12. A golf shoe cleat comprising a main body member having an inner face and an outer face, a shoe-attaching member projecting perpendicularly outwardly from said inner face and said shoe-attaching member having an axis AL and adapted to secure said cleat in a receptacle in said golf shoe upon rotation of said shoe mounting member in said receptacle,*

*a circular array of tapered traction teeth formed of a resilient and flexible material projecting from the perimeter of said main body member, each traction tooth having an outer traction surface extending from said main body member in a direction away from and at an angle to said axis AL to enhance lateral stability and traction through the plane of a golf swing.*

*13. The golf shoe cleat defined in claim 12, wherein said outer face is substantially planar and said traction teeth project from said outer face.*

*14. The golf shoe cleat defined in claim 12, wherein said outer face is dome-shaped and said traction teeth project from said outer face.*

*15. The golf shoe cleat defined in claim 12, wherein each traction tooth has an axis ALT which is angled away from said axis AL, said axis ALT having an outward angulation relative to said axis AL to enhance said lateral stability and traction through the plane of a golf swing.*

*16. The golf shoe cleat defined in claim 15, wherein the angle between each said tooth axis ALT and said axis AL is about 37½ degrees.*

*17. The golf shoe cleat defined in claim 12, wherein the traction teeth are low-profile traction teeth.*

*18. The golf shoe cleat as defined in claim 12, wherein the traction teeth are tapered away from the main body member.*

*19. A golf shoe with cleats, comprising:*

*a shoe including a sole having a plurality of receptacles formed therein; and*

*a plurality of cleats, each cleat secured to one of the receptacles in the sole, each of said cleats comprising:*

*a main body member having an inner face and an outer face, a shoe-attaching member projecting perpendicularly outwardly from said inner face and said shoe-attaching member having an axis AL and adapted to secure said cleat in said one of the receptacles upon rotation of said shoe mounting member in said receptacle, and*

*a plurality of low-profile traction teeth projecting around the perimeter of the outer face of said main body member, each traction tooth having an outer traction surface facing away from said axis AL, said*

*outer surface having an outward angulation relative to said axis AL to enhance lateral stability and traction through the plane of a golf swing.*

*20. A golf shoe including a sole having a plurality of cleats mounted therein, each of said cleats comprising:*

*a body member having an outer face and an inner face,*

*a shoe attaching member having an axis AL extending perpendicular to said inner face and adapted to secure the cleat in a receptacle in the sole of the shoe, and*

*a plurality of teeth projecting from the outer face of said body member, wherein at least some of said plurality of teeth are disposed adjacent the perimeter of the outer face and have an outer traction surface facing away from said axis AL, said outer surface having an outward angulation relative to said axis AL to enhance lateral stability and traction through the plane of a golf swing.*

*21. A golf shoe according to claim 20, wherein said teeth disposed adjacent the perimeter of the outer face are arranged in a generally circular perimetrical pattern.*

*22. A golf shoe according to claim 21, wherein said teeth are circumferentially spaced substantially equidistantly from one another.*

*23. A golf shoe according to claim 20, wherein one or more of said teeth are not outwardly angled.*

*24. A golf shoe including a sole having an outer edge, a plurality of cleats mounted in receptacles formed in said sole, each of said cleats comprising:*

*a body member having an outer face and an inner face,*

*a shoe attaching member having an axis AL extending perpendicular to said inner face and adapted to secure the cleat in a receptacle in the sole of the shoe,*

*a plurality of outwardly angled traction teeth projecting from the outer face of said body member, each outwardly angled traction tooth having an outer traction surface facing away from said axis AL, said outer surface having an outward angulation relative to said axis AL to enhance lateral stability and traction through the plane of a golf swing, and*

*means for locking said cleats in said receptacles upon rotation of said cleats therein such that a plurality of said outwardly angled teeth on each of said cleats are disposed adjacent to and face the outer edge of the sole.*

* * * * *